(12) United States Patent
Ray et al.

(10) Patent No.: US 7,149,048 B1
(45) Date of Patent: Dec. 12, 2006

(54) METHOD AND APPARATUS FOR IMPROVING SPIRAL-BASED POSITION CORRECTION SYSTEM STABILITY VIA KERNEL FREQUENCY COMPONENT MODIFICATION

(75) Inventors: Bill Ray, Broomfield, CO (US); Tim Everett, Niwot, CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 10/859,068

(22) Filed: Jun. 2, 2004

Related U.S. Application Data (60) Provisional application No. 60/475,114, filed on Jun. 2, 2003, provisional application No. 60/475,129, filed on Jun. 2, 2003.

(51) Int. Cl.
*G11B 5/596* (2006.01)
*G11B 5/09* (2006.01)
*G11B 21/02* (2006.01)

(52) U.S. Cl. .............................. 360/77.04; 360/78.09
(58) Field of Classification Search ............ 360/77.04, 360/78.09
See application file for complete search history.

(56) References Cited

U.S. PATENT DOCUMENTS

| | | | |
|---|---|---|---|
| 5,668,679 A | 9/1997 | Swearingen et al. ......... 360/75 |
| 5,793,559 A * | 8/1998 | Shepherd et al. ......... 360/78.09 |
| 6,061,200 A | 5/2000 | Shepherd et al. ......... 360/77.04 |
| 6,115,203 A | 9/2000 | Ho et al. ................. 360/77.04 |
| 6,437,936 B1 * | 8/2002 | Chen et al. ............. 360/77.04 |
| 6,549,362 B1 | 4/2003 | Melrose et al. ......... 360/77.04 |
| 7,019,937 B1 | 3/2006 | Liikanen et al. ......... 360/77.11 |

OTHER PUBLICATIONS

U.S. Appl. No. 10/318,316, filed Dec. 11, 2002, Hargarten et al.
U.S. Appl. No. 10/858,838, filed Jun. 2, 2004, Ray et al.

* cited by examiner

*Primary Examiner*—Wayne Young
*Assistant Examiner*—Jason Olson
(74) *Attorney, Agent, or Firm*—Tejpal S. Hansra (57) ABSTRACT

The present invention is directed to a method and apparatus for improving spiral-based position correction system stability via kernel frequency component modification. In one embodiment, a disk drive includes a disk surface with servo information written thereon, wherein the servo information includes repeatable runout. The disk drive includes a servo system having an error transfer function. Frequencies, where the error transfer function may experience phase changes, are determined and the direction of such phase changes are also determined. A kernel, which is used to calculate position correction values to compensate for repeatable runout, is provided. Phases of frequency components in the kernel, which correspond to the frequencies where the error transfer function may experience phase changes, are rotated.

52 Claims, 10 Drawing Sheets

METHOD AND APPARATUS FOR IMPROVING SPIRAL-BASED POSITION CORRECTION SYSTEM STABILITY VIA KERNEL FREQUENCY COMPONENT MODIFICATION

CROSS-REFERENCE TO RELATED APPLICATIONS

Priority is claimed from U.S. Provisional Patent Application Ser. No. 60/475,114 filed Jun. 2, 2003, which is incorporated herein by reference in its entirety. Priority is also claimed from U.S. Provisional Patent Application Ser. No. 60/475,129 filed Jun. 2, 2003, which is also incorporated herein by reference in its entirety.

FIELD OF THE INVENTION

The present invention relates generally to data storage devices, such as disk drives. More particularly, the present invention relates to a method and apparatus for improving spiral-based position correction system stability via kernel frequency component modification.

BACKGROUND OF THE INVENTION

Computer disk drives store information on magnetic disks. Typically, the information is stored on each disk in concentric tracks that are divided into sectors. Information is written to and read from a disk by a transducer that is mounted on an actuator arm capable of moving the transducer radially over the disk. Accordingly, the movement of the actuator arm allows the transducer to access different tracks. The disk is rotated by a spindle motor at high speed which allows the transducer to access different sectors on the disk.

Figure 1:
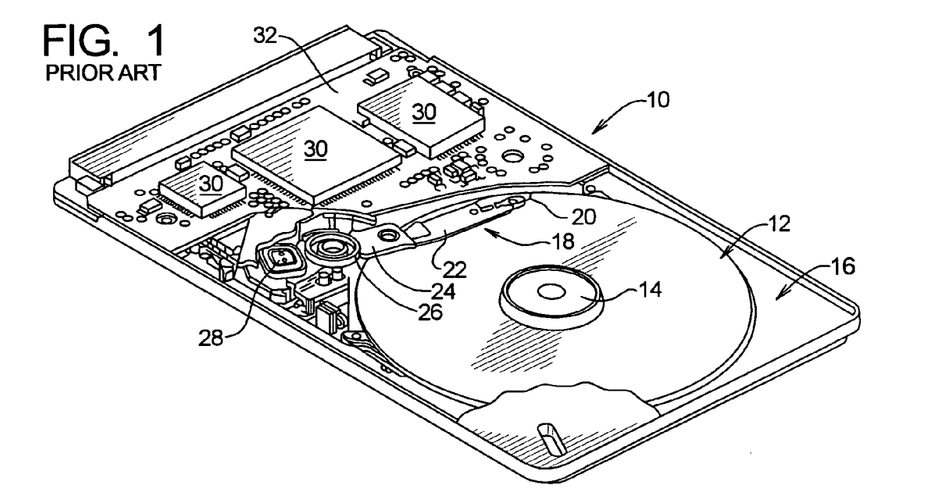
FIG. 1 is a diagrammatic representation illustrating a conventional disk drive with its top cover removed.

A conventional disk drive, generally designated 10, is illustrated in FIG. 1. The disk drive comprises a disk 12 that is rotated by a spin motor 14. The spin motor 14 is mounted to a base plate 16. An actuator arm assembly 18 is also mounted to the base plate 16.

The actuator arm assembly 18 includes a transducer 20 mounted to a flexure arm 22 which is attached to an actuator arm 24 that can rotate about a bearing assembly 26. The actuator arm assembly 18 also contains a voice coil motor 28 which moves the transducer 20 relative to the disk 12. The spin motor 14, voice coil motor 28 and transducer 20 are coupled to a number of electronic circuits 30 mounted to a printed circuit board 32. The electronic circuits 30 typically include a read channel chip, a microprocessor-based controller and a random access memory (RAM) device.

The disk drive 10 typically includes a plurality of disks 12 and, therefore, a plurality of corresponding actuator arm assemblies 18. However, it is also possible for the disk drive 10 to include a single disk 12 as shown in FIG. 1.

Figure 2:
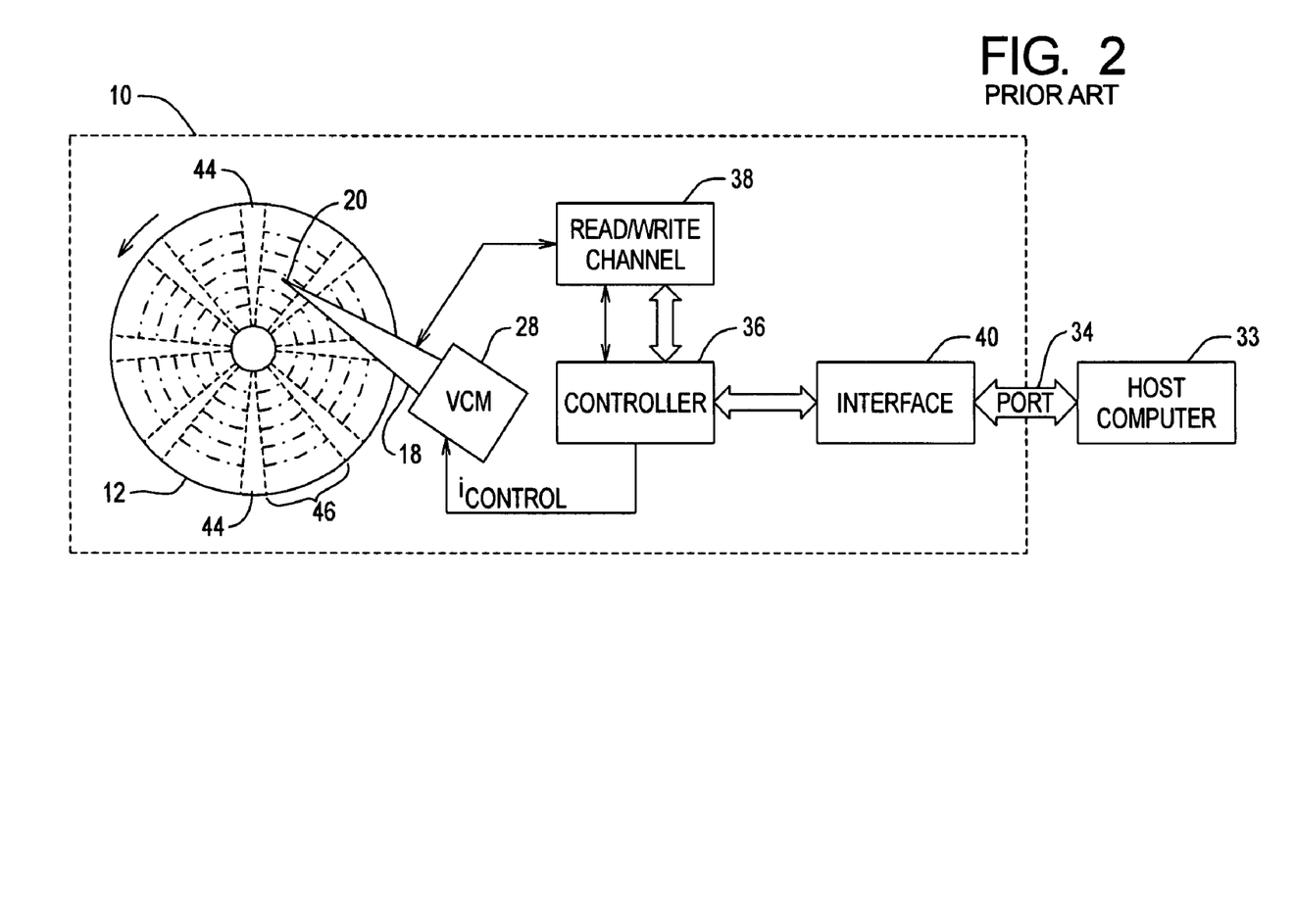
FIG. 2 is a functional block diagram which illustrates a conventional disk drive that is coupled to a host computer via an input/output port.

FIG. 2 is a functional block diagram which illustrates a conventional disk drive 10 that is coupled to a host computer 33 via an input/output port 34. The disk drive 10 is used by the host computer 33 as a data storage device. The host 33 delivers data access requests to the disk drive 10 via port 34. In addition, port 34 is used to transfer customer data between the disk drive 10 and the host 33 during read and write operations.

In addition to the components of the disk drive 10 shown and labeled in FIG. 1, FIG. 2 illustrates (in block diagram form) the disk drive's controller 36, read/write channel 38 and interface 40. Conventionally, data is stored on the disk 12 in substantially concentric data storage tracks on its surface. In a magnetic disk drive 10, for example, data is stored in the form of magnetic polarity transitions within each track. Data is "read" from the disk 12 by positioning the transducer 20 above a desired track of the disk 12 and sensing the magnetic polarity transitions stored within the track, as the track moves below the transducer 20. Similarly, data is "written" to the disk 12 by positioning the transducer 20 above a desired track and delivering a write current representative of the desired data to the transducer 20 at an appropriate time.

The actuator arm assembly 18 is a semi-rigid member that acts as a support structure for the transducer 20, holding it above the surface of the disk 12. The actuator arm assembly 18 is coupled at one end to the transducer 20 and at another end to the VCM 28. The VCM 28 is operative for imparting controlled motion to the actuator arm 18 to appropriately position the transducer 20 with respect to the disk 12. The VCM 28 operates in response to a control signal $i_{control}$ generated by the controller 36. The controller 36 generates the control signal $i_{control}$, for example, in response to an access command received from the host computer 33 via the interface 40 or in response to servo information read from the disk surface 12.

The read/write channel 38 is operative for appropriately processing the data being read from/written to the disk 12. For example, during a read operation, the read/write channel 38 converts an analog read signal generated by the transducer 20 into a digital data signal that can be recognized by the controller 36. The channel 38 is also generally capable of recovering timing information from the analog read signal. During a write operation, the read/write channel 38 converts customer data received from the host 33 into a write current signal that is delivered to the transducer 20 to "write" the customer data to an appropriate portion of the disk 12. As will be discussed in greater detail, the read/write channel 38 is also operative for continually processing data read from servo information stored on the disk 12 and delivering the processed data to the controller 36 for use in, for example, transducer positioning.

Figure 3:
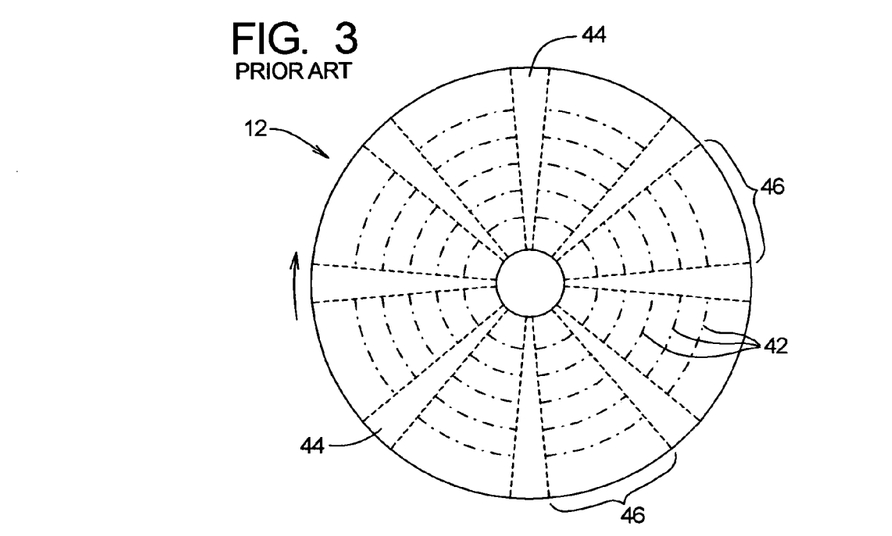
FIG. 3 is a diagrammatic representation of a top view of a magnetic storage disk illustrating a typical organization of data on a disk surface.

FIG. 3 is a top view of a magnetic storage disk 12 illustrating a typical organization of data on the surface of the disk 12. As shown, the disk 12 includes a plurality of concentric data storage tracks 42, which are used for storing data on the disk 12. The data storage tracks 42 are illustrated as center lines on the surface of the disk 12; however, it should be understood that the actual tracks will each occupy a finite width about a corresponding centerline. The data storage disk 12 also includes servo information in the form of a plurality of radially-aligned servo spokes 44 (or wedges) that each cross the tracks 42 on the disk 12. The servo information in the servo spokes 44 is read by the transducer 20 during disk drive operation for use in positioning the transducer 20 above a desired track 42 of the disk 12. Among other things, the servo information includes a plurality of servo bursts (e.g., A, B, C and D bursts or the like) that are used to generate a Position Error Signal (PES) to position the write head relative to a track's centerline during a track following operation. The portions of the track between servo spokes 44 are used to store customer data received from, for example, the host computer 33 and are referred to as customer data regions 46.

It should be understood that, for ease of illustration, only a small number of tracks 42 and servo spokes 44 have been shown on the surface of the disk 12 of FIG. 3. That is, conventional disk drives include one or more disk surfaces having a considerably larger number of tracks and servo spokes.

During the disk drive manufacturing process, a special piece of equipment known as a servo track writer (STW) is used to write the radially-aligned servo information which forms servo spokes 44. A STW is a very precise piece of equipment that is capable of positioning the disk drive's write head at radial positions over the disk surface, so that servo information is written on the disk surface using the disk drive's write head with a high degree of positional accuracy.

In general, a STW is a very expensive piece of capital equipment. Thus, it is desirable that a STW be used as efficiently as possible during manufacturing operations. Even a small reduction in the amount of data needed to be written by the STW per disk surface can result in a significant cost and time savings.

A STW is used to write servo information, by controlling the position of the disk drive's write head, on a disk surface in a circumferential fashion at each radius at which the disk drive's write head is positioned. During drive operation, the servo information is used to position the transducer of the disk drive over the appropriate data track and data sector of the disk. Accordingly, as the number of tracks per inch (TPI) increases, the amount of time necessary to write servo information increases. That is, the number of circumferential passes that a STW must make over a disk surface increases as TPI increases. Thus, unless more STWs are supplied, manufacturing times will continually increase as the TPI increases.

Instead of using a STW to write servo information in a circumferential fashion at each radius, the assignee of the present invention presently uses a STW to write servo information in a spiral fashion (in at least some of its disk drives). Specifically, the STW moves the write head in a controlled manner (e.g., at a constant velocity or along a velocity profile) from the outer diameter of the disk to the inner diameter of the disk (or visa-versa) as the disk spins.

Figure 4:
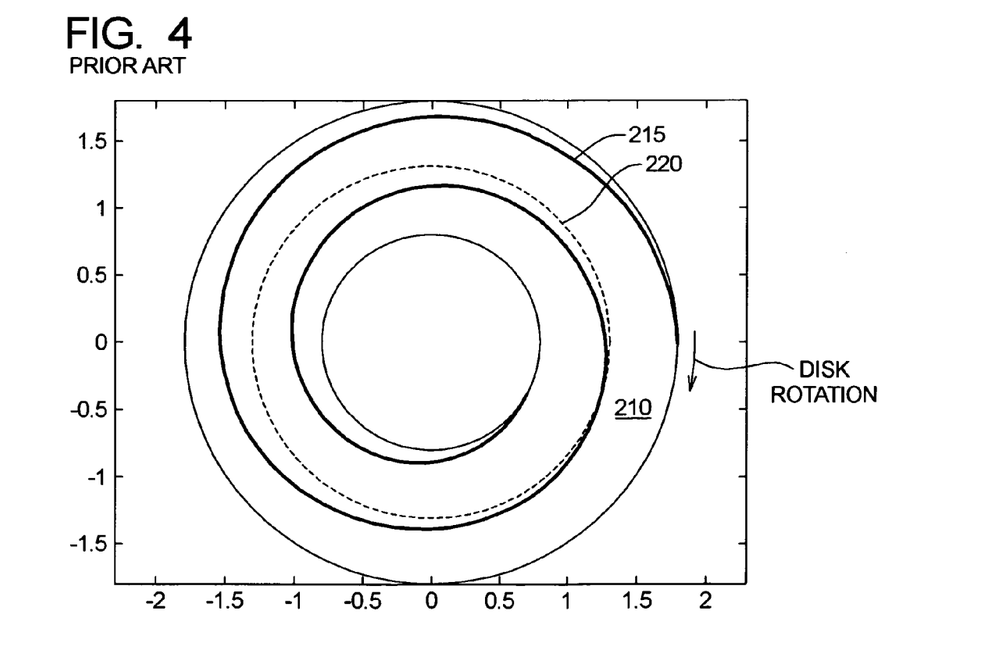
FIG. 4 is a diagrammatic representation of a disk surface having a spiral of servo information written thereon, along with a circular data storage track.

FIG. 4 is a diagrammatic representation of a disk surface 210 having a first spiral of servo information 215 written thereon. The dashed line, identified by reference numeral 220, represents a track. The first spiral of servo information 215 may make multiple revolutions around the disk surface 210 (roughly two revolutions as shown in FIG. 4), but only crosses track 220 once.

Figure 5:
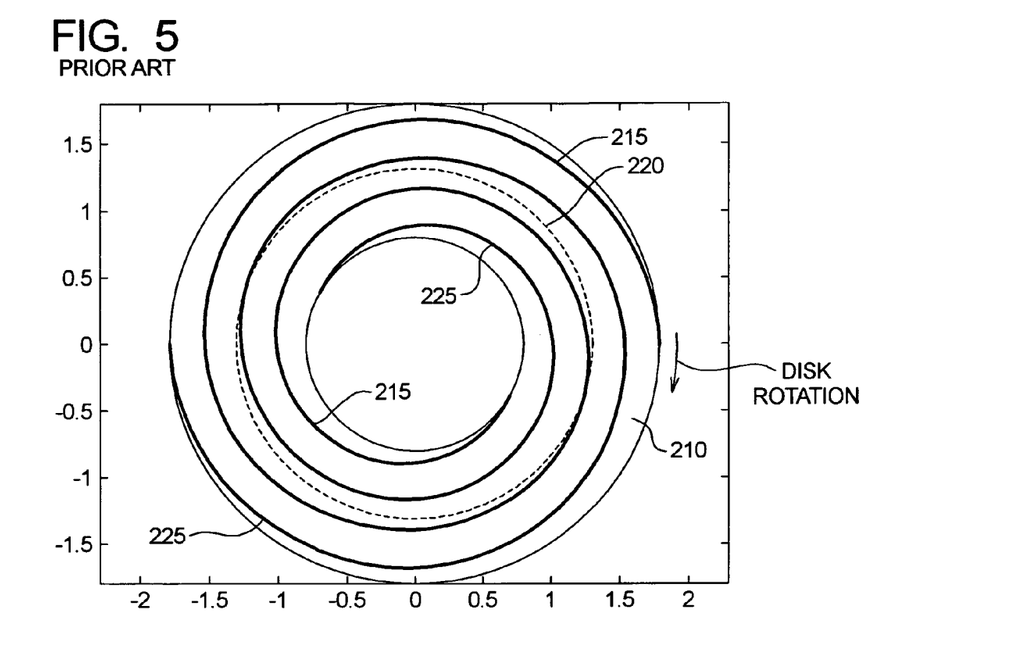
FIG. 5 is a diagrammatic representation of a disk surface having two spirals of servo information written thereon, along with a circular data storage track.

FIG. 5 is a diagrammatic representation of a disk surface 210 having a first spiral of servo information 215 and a second spiral of servo information 225 written thereon. As shown in FIG. 5, the first and second spirals 215, 225 are interlaced with one another and are written approximately 180 degrees apart. Again, each spiral crosses track 220 only once.

Additional spirals of servo information may be written on the disk surface 210 depending upon the servo sample rate (that is, the number of servo samples required for each track 220 to keep the disk drive's transducer sufficiently on-track). For example, if a servo sample rate of 120 equally-spaced servo sectors per track was required, 120 equally-spaced spirals may be written on the disk surface 110. Accordingly, by writing servo information in a spiral fashion, the time necessary to write servo information on disk surface 110 using the STW is a function of the servo sample rate (i.e., the number of spirals of servo information to be written) rather than the number of tracks.

Figure 6:
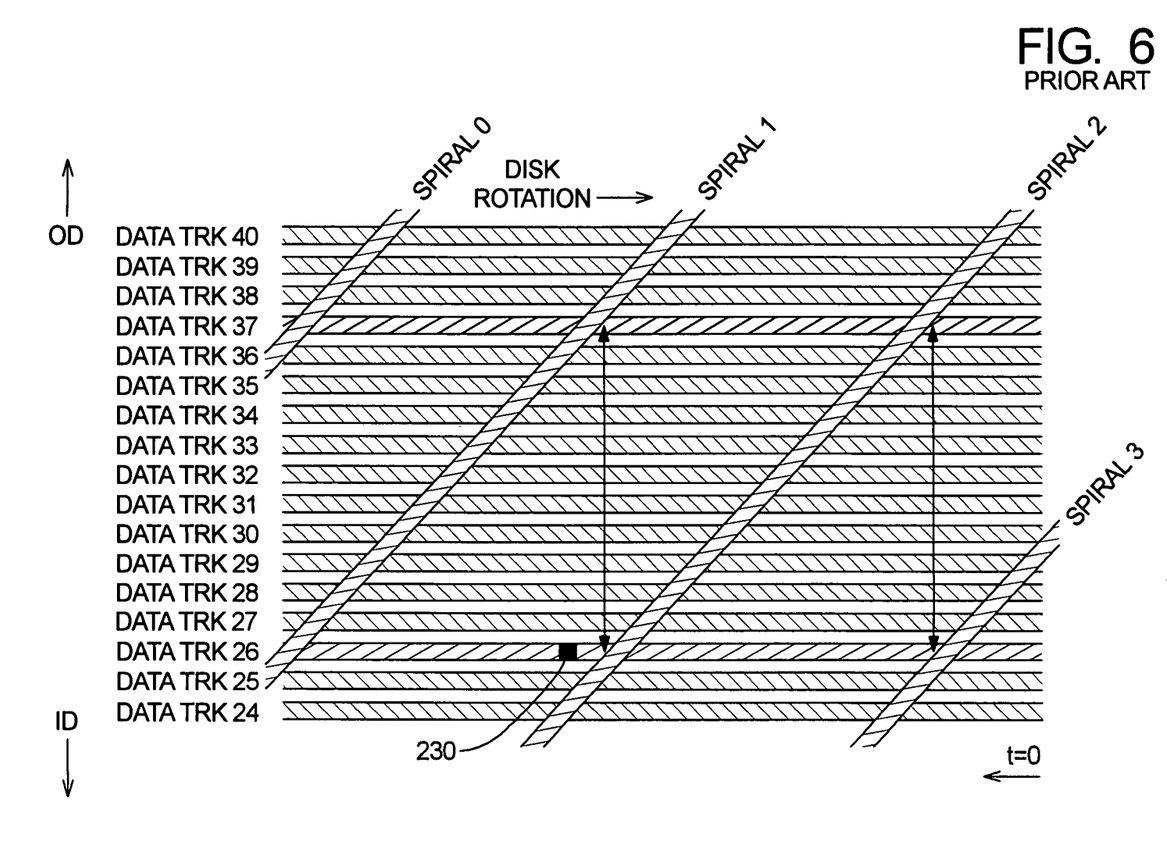
FIG. 6 is a diagrammatic representation of a magnified view of a portion of FIG. 5 showing additional spirals of servo information in a linear, instead of arcuate fashion, for ease of depiction.

FIG. 6 is a diagrammatic representation of a magnified view of a portion of FIG. 5 showing additional spirals of servo information (i.e., portions of four spirals are shown in FIG. 6). Furthermore, FIG. 6 is shown in a linear, instead of arcuate fashion, for ease of depiction.

At any given track 220 (Data Tracks 24–40 are depicted in FIG. 6), the disk drive's read head 230 (also referred to herein as the reader) will cross over the spirals of servo information at intervals equal to the sample rate. Furthermore, the read head 230 will cross over the spirals of servo information at an angle. Additionally, the number of spirals of servo information that cross each of the tracks 220 will be equivalent. For a given track 220, the spacing between adjacent spirals of servo information will be approximately equidistant.

It should be noted that a read head 230 placed on a track 220 closer to the inner diameter (ID) of the disk surface 210 will cross a given spiral of servo information at a time slightly delayed from a track 220 closer to the outer diameter (OD) of the disk surface. For example, suppose that: (1) time zero (t=0) is defined towards the right side of FIG. 6; (2) time increases in the figure from right to left along the horizontal; and, (3) the disk is rotating in the direction indicated by corresponding arrow shown in FIG. 6. If the read head 230 was placed above Data Track 26 at time zero and the disk was rotated, the read head 230 would cross Spiral 2 at a point later in time than if the read head 230 was placed on Data Track 37 under similar conditions, since Data Track 26 is closer to the inner diameter than Data Track 37.

Referring again to FIGS. 4 and 5, the spirals of servo information are written by moving the disk drive's write head using the STW in a generally radial direction (more accurately, in a radial direction along an arc due to the position of the bearing assembly), while both the disk is spinning and the write head is enabled. The direction of disk rotation is indicated by an arrow as shown in each of FIGS. 4 and 5.

The disk drive's write head is enabled for its entire stroke (i.e., from OD to ID or visa-versa) while under the control of the STW. As a result, a continuous spiral of servo information is written.

Each of the spirals of servo information includes sync marks written at fixed time intervals by the disk drive's write head. As mentioned above, the STW is used to move the disk drive's write head at some fixed velocity (or velocity profile) in a generally radial direction across the disk surface. If the time interval between sync marks is known and the velocity of the disk drive's write head is known, the distance between sync marks along a spiral can be determined. Specifically, the following formula may be applied: Distance=(STW Velocity)(Time), where Distance represents the radial distance between sync marks, STW Velocity represents the radial velocity of the disk drive's write head (under control of the STW) and Time represents the interval between sync marks.

For example, the interval between sync marks may be set at 1 microsecond, while the write head may be controlled to move at a radial velocity of 10 inches per second along its stroke. Thus, the radial distance between sync marks can be calculated to be 1 microinch along each spiral.

Each sync mark along a given spiral corresponds to a unique radius. Accordingly, the sync marks may be used to accurately position a transducer of a disk drive over the disk surface.

Figure 7:
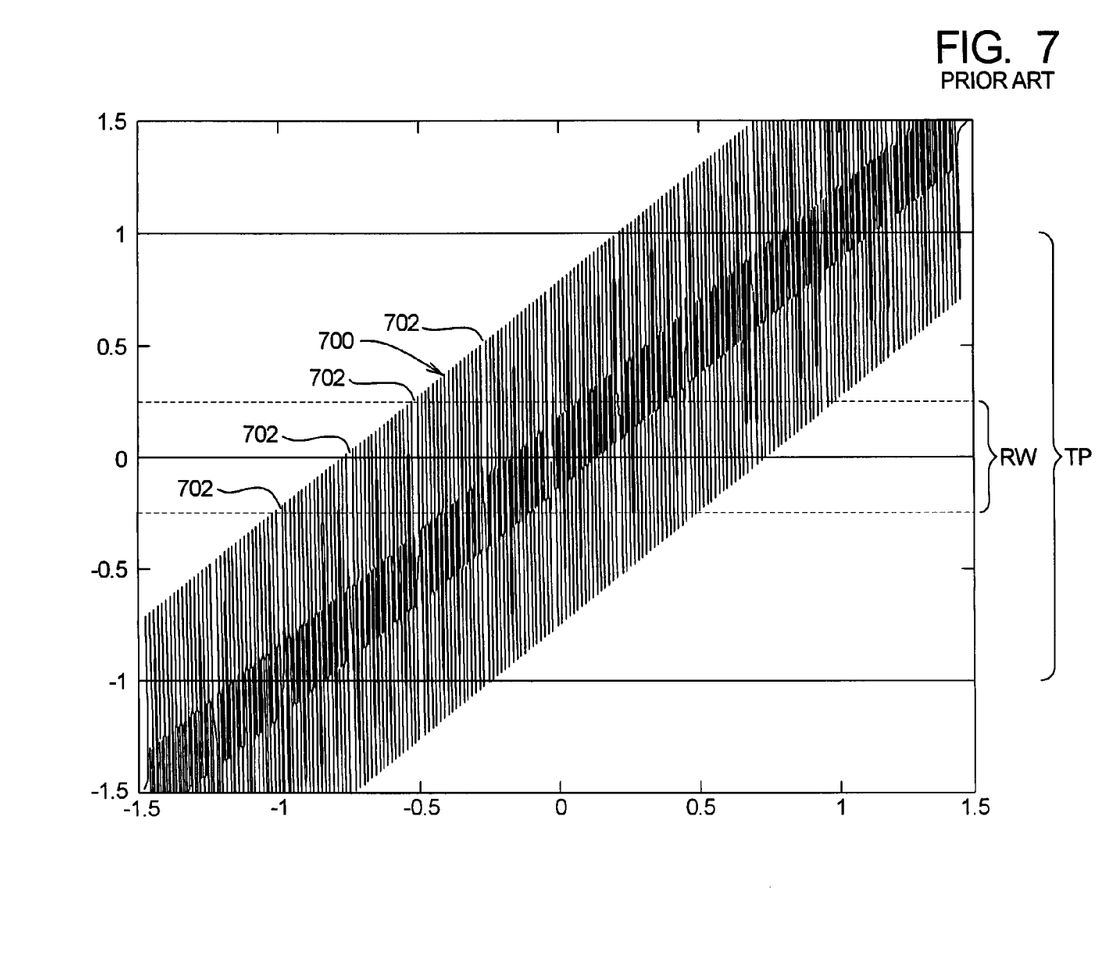
FIG. 7 is a diagrammatic representation of a magnified portion of one of the spirals of servo information shown in FIG. 6.

FIG. 7 is a diagrammatic representation of a magnified portion of one of the spirals of servo information shown in FIG. 6. FIG. 7 is intended to provide a representation of the track pitch (TP) of a circumferential data track and the reader width (RW). The spiral 700 is a continuous, single-frequency pattern having sync marks 702 embedded therein. The sync marks 702 constitute phase shifts within the spiral pattern. In FIG. 7, the sync marks 702 are shown as regularly-spaced white areas within the spiral 700.

Figure 8:
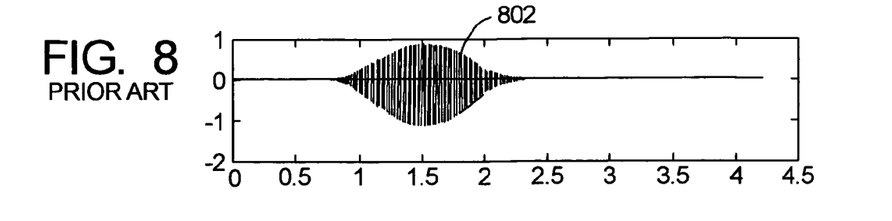
FIG. 8 is a diagrammatic representation of a read signal that is generated as the reader reads a portion of a spiral of servo information while the disk is spinning.

FIG. 8 is a diagrammatic representation of a read signal that is generated as the reader 230 reads a portion of a spiral of servo information while the disk is spinning. In FIG. 8, the x-axis represents time, while the y-axis represents signal amplitude. The depicted shape is known herein as the read signal envelope 802.

In general, the shape of each read signal envelope 802 will be approximately the same (e.g., roughly a football shape) over the entire disk surface. The position of the read signal envelope in time changes based upon the position of the reader 230. Although the read signal envelope moves relative to the position of the reader 230, the sync pattern within the spiral being read does not move. Accordingly, the envelope moves relative to the sync marks. Since the sync marks are at known radial positions, the sync marks provide a position reference.

A position error signal (PES) is determined by calculating the position of the reader relative to a known reference point (i.e., one of the sync marks) within the spiral servo pattern. The position of the reader is given by the centroid of the read signal envelope and is determined by integrating the read signal envelope over a hardware integration window of fixed-size (described in more detail below) to determine the read signal envelope's area (i.e., by performing a power integration) and, then, dividing by two. This is known as the half-integrator value.

Figure 9:
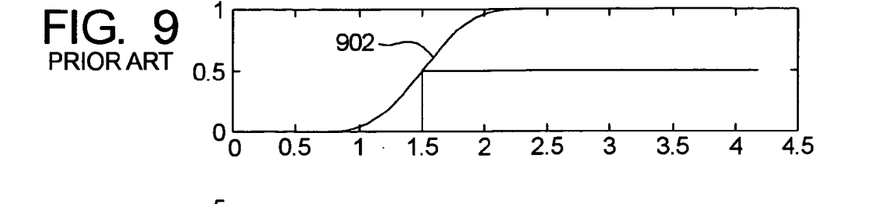
FIG. 9 is a diagrammatic representation of an integration curve in normalized units.

A diagrammatic representation of an integration curve 902 in normalized units is shown in FIG. 9. The position of the reader is at 1.5 arbitrary units along the x-axis, where half of the integrated value of the read signal envelope is to the right of the position of the reader and half of the integrated value of the read signal envelope is to the left of the position of the reader.

Figure 10:
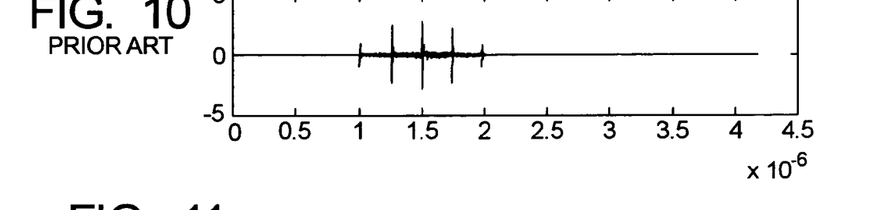
FIG. 10 is a diagrammatic representation illustrating five (5) sync marks in a read signal envelope.

As mentioned above, once the position of the reader is determined (i.e., by determining the half-integration value), the PES is determined by comparing the position of the reader relative to one of the sync marks. FIG. 10 is a diagrammatic representation illustrating five (5) sync marks in the read signal envelope.

Figure 11:
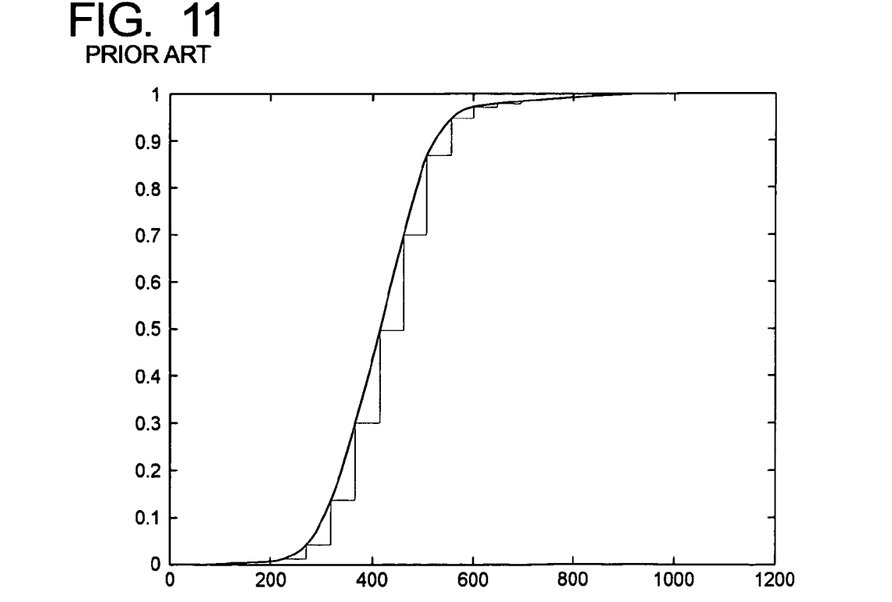
FIG. 11 is a diagrammatic representation of exemplary saved integrator values.

To determine the time at which the half integrator value occurs, it is necessary to record the integration values at various sample points over the integration interval, wherein the integration interval is defined by the integration window. One convenient sample interval is the same as the sync mark-to-sync mark interval. This sample interval "frames" a sync mark and, therefore, is known as the frame interval (or frame). The spiral energy integration value is determined at each frame interval and accumulated, so that the time of the reader position can be calculated after the entire spiral has passed under the reader. An example of saved integrator values is shown in FIG. 11. It should be noted that the values in FIG. 11 do not correspond to the read signal envelope of FIG. 8. Instead, the values in FIG. 11 are based on an altogether different read signal envelope.

To reference the position of the reader relative to a sync mark, the time at which each occurs must be known. The time of the reader position is found by searching the array of integrator values to find the corresponding frame interval containing the half integrator value. Linear interpolation is used to find the exact time of the half-integrator value relative to one of the end points of the frame interval. The interpolation uses the saved integrator values on either side of the half-integrator value to compute a localized slope of the integrator around the head position. The localized slope calculation incorporates the change in integrator values over a known distance.

To reference the reader position to the known reference points in the spiral, the time is saved at which each sync mark is detected. Because the frame interval is the same as the sync-to-sync interval, a clock is started at the beginning of each frame to count the time from the beginning of the frame to when a sync mark is detected. This time may also be saved in an array similar to the integrator values. A computation is then performed to determine the difference in time from (1) the beginning of the frame interval to the reader position and (2) the beginning of the frame interval to the sync position. The difference in time is then scaled to position by the relationship between the sync-to-sync spacing of radius and time.

Once the reader position is referenced to a sync mark, a determination must be made as to whether the reader position and the sync mark are the desired, or targets, of the track following system. If the reader position is found to be 10% away from a sync mark, but the sync mark is actually 1 away from the target sync mark, then the sync to sync spacing must be added to the reader position to demodulate the full reader position. For example, if there were 4 sync marks per track, then the sync spacing is 25% of a track. If the reader position is found to be 10% away from a sync mark and the sync mark is 1 away from the target sync mark, then the position of the reader would be demodulated as 35% of a track away from the target location.

Figure 12:
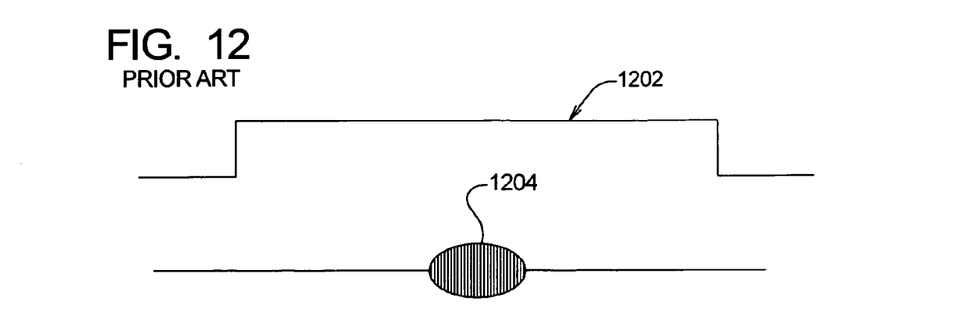
FIG. 12 is a schematic representation of an integration window and a read signal envelope, wherein the read signal envelope is centered in the integration window.

FIG. 12 is a schematic representation of an integration window 1202 and a read signal envelope 1204. The integration window 1202 is opened around the expected position of the read signal envelope 1204. In FIG. 12, the read signal envelope 1204 is centered in the integration window 1202. In such case, the position error signal (PES) would be zero.

Figure 13A:
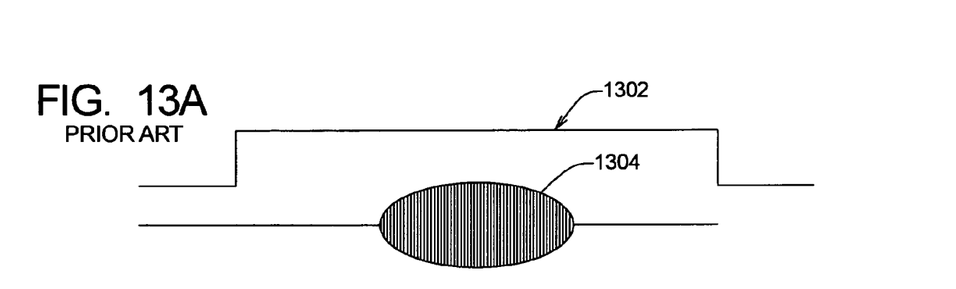
FIG. 13A is a schematic diagram illustrating a read signal envelope that is centered in an integration window.
Figure 13B:
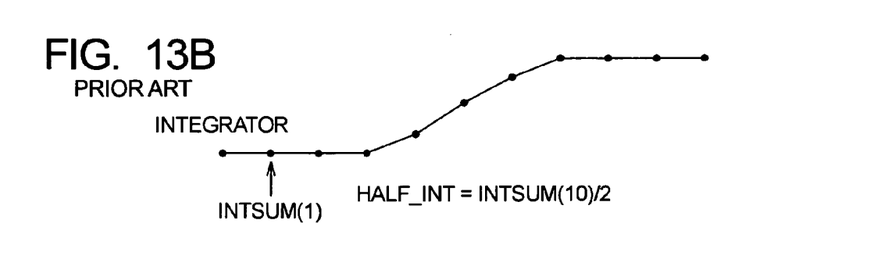
FIG. 13B is a schematic diagram illustrating a curve representing accumulated integration values across the integration window of FIG. 13A.

FIG. 13A is a schematic illustration of a read signal envelope 1304 that is centered in the integration window 1302 (i.e. the PES should be zero). FIG. 13B is a schematic illustration of a curve representing accumulated integration values across the integration window, wherein each dot represents accumulated integration values at a frame.

In certain instances, repeatable runout (RRO) may be introduced into the servo system. For example, RRO may be introduced when the write head is not moved at its expected velocity across the disk surface during the spiral writing process. RRO may also be introduced when the spiral-to-spiral spacing is not identical at a particular radius or over the disk surface.

Figure 14:
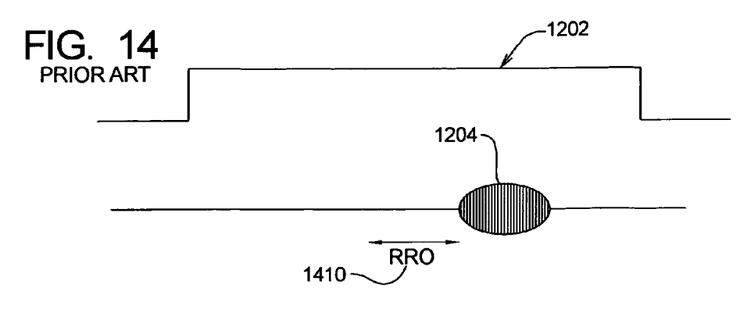
FIG. 14 is a schematic diagram illustrating an integration window and a read signal envelope, wherein the read signal envelope is shifted from the center of the integration window due to RRO.

FIG. 14 is a schematic diagram illustrating an integration window 1202 and a read signal envelope 1204 that is shifted from the center of the integration window 1202 due to RRO 1410. The presence of RRO may be problematic in demodulating the PES.

For example, assume that, at a particular radius, a spiral has an RRO equal to about two frames and the read signal envelope appears exactly in the center of the integration window. If no accounting was made for the RRO, the demodulated PES would, erroneously, be zero. In fact, the PES should correspond with a read head position that is two frames off-track.

Figure 15:
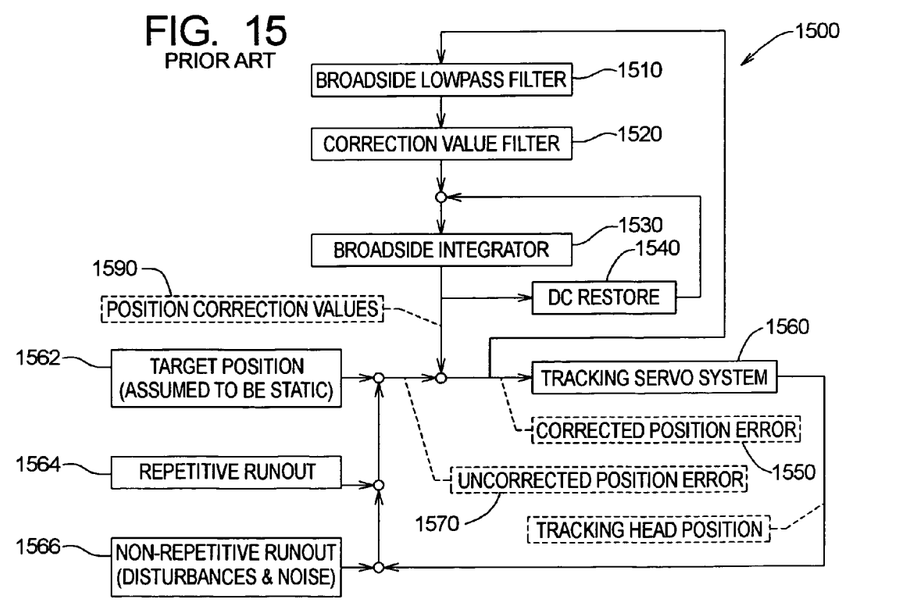
FIG. 15 is a block diagram illustrating an integrating spiral position correction system, which is used to reduce RRO in a disk drive having spiral servo information stored on a disk surface.

FIG. 15 an integrating spiral position correction system 1500, which may be used to reduce RRO in a disk drive having a disk surface with spiral servo information written thereon. The integrating spiral position correction system 1500 generates and applies position correction values, based upon spiral PES history and knowledge of the servo error transfer function, to cause the repetitive portion of the spiral PES to approach zero. Position correction values are continuously modified, via integration, while tracking, as opposed to recalculating the correction values at every track. This is accomplished by taking advantage of the high degree of correlation in the repetitive runout in neighboring tracks and, therefore, uses less processing time.

The system 1500 generates position correction values with the same magnitude but opposite polarity as the repetitive runout signal. The position correction values are used to cancel out the contribution of the repetitive runout signal to the corrected position error signal.

As shown in FIG. 15, position correction values are determined using a broadside low-pass filter 1510, a correction value filter 1520, a broadside integrator 1530 and a DC restore 1540. It should be noted that the broadside low-pass filter 1510 is optional.

The broadside lowpass filter 1510 includes a bank of filters equal in number to the number of spirals observed in a revolution of the disk. Each filter in the bank lowpasses the corrected position error samples 1550 from a specific spiral. Consequently, the sample rate for these filters is the same as the period of the disk's rotation. Lowpassing the samples for each spiral individually reduces the high-frequency content, or variation, in the filter output for each spiral, as opposed to reducing the variation in a sequential stream of outputs. The net effect of the broadside lowpass filter 1510 is to suppress the non-repetitive runout portion of the signal, while presenting the repetitive runout related portion of the signal to the correction value filter 1520.

The correction value filter 1520 processes its input to compensate for the effects of the tracking servo system 1560 upon the loop's input signals (target position 1562, repetitive runout 1564, and non-repetitive runout 1566). Specifically, the tracking servo system 1560 modifies the input signals by $1/[1+T]$, where T represents the open loop gain of the tracking servo system, to form the uncorrected position error signal 1570. The tracking servo system 1560 also modifies the position correction values by $1/[1+T]$ as they become a component of the corrected position error signal 1550. Canceling the repetitive runout requires that the position correction values 1590 be equal to the repetitive runout samples, but opposite in sign. The repetitive runout related portion of the input to the broadside lowpass filter 1510 (or correction value filter 1520, if no broadside lowpass filter 1510 is provided) is scaled by $1/[1+T]$ by the tracking servo system 1560. Consequently, a scaling factor of $[1+T]$ must be applied to recover the original repetitive runout samples. Accordingly, the correction value filter 1520 has a transfer function proportional to and approximating $[1+T]$.

The broadside integrator 1530, like the broadside lowpass filter 1510, is a bank of integrators equal in number to the number of spirals observed in a revolution of the disk. Each integrator acts on an output of the correction value filter 1520 associated with a single spiral. The integrators accumulate estimates of the residual repetitive runout values that are at the output of the correction value filter 1520. Inevitably, the correction value filter 1520 does not exactly compensate for the effects of the tracking servo system 1560 and its outputs do not completely cancel the repetitive runout. This leaves residual repetitive runout in the corrected position error 1550. The residual repetitive runout circulates back through the correction value filter 1510 to present new, and diminished, inputs to the integrators. While residual repetitive runout exists, the correction value filter 1520 will output non-zero results, and those results will be integrated to form better position correction values 1590. Ideally, as the position correction values converge to cancel the repetitive runout, the repetitive runout related portion of the input to the broadside integrator 1530 would disappear, and the integrators would hold their values. Over time, this system would substantially remove repetitive runout from the corrected position error signal.

The DC restore 1540 operates to remove any DC, or offset, that may develop in the position correction values. The construction of the correction value filter 1520 attempts to eliminate any DC component at the filter's output (so that the position correction values average to zero about the revolution). However, physical implementations of both the correction value filter 1520 and the broadside integrator 1530 may result in the undesirable build up of an offset at the output of the broadside integrator 1530. The DC restore 1540 measures any such offset and subtracts a portion of it from the input to the broadside integrator 1530, effectively removing the offset over time.

The broadside lowpass filter 1510 of FIG. 15 can be removed to realize a simpler system, but with less non-repeatable runout rejection. As another alternative, the broadside integrator 1530 and DC restore 1540 could be removed to realize a simpler system, but with less repetitive runout rejection.

There is a high degree of track-to-track correlation of the repetitive runout, which is a significant characteristic of spiral-based feedback. The highly correlated runout results in position correction values that change only slightly from track-to-track.

As mentioned above, ideally, the position correction values would converge to cancel the repetitive runout. Thus, the repetitive runout related portion of the input to the broadside integrator 1530 would disappear, and the integrators would hold their values. Over time, the system 1500 would substantially remove repetitive runout from the corrected position error signal. Once the repetitive runout was removed from the spirals, a self-servo writing process could be employed to servo using the spiral servo information while writing a final servo pattern (e.g., one that looks like the conventional servo pattern of FIG. 3). By eliminating repetitive runout prior to (or while) servoing on the spiral servo pattern, repeatable runout errors would not be propagated while writing the final servo patterns.

The inventors have determined that, during the self-servo writing process (which may take several hours), in-situ changes occur in the disk drive's plant (e.g., in the VCM or other elements of the plant) causing instabilities which either impair the self-servo write process or which result in a failure of the self-servo write process. The inventors have also determined that the instabilities occur due to the track servo system's actual error transfer function not matching the kernel (which is a table of digital values stored in memory that approximates the inverse of the error transfer function of disk drive's servo system) used in the system 1500 of FIG. 15. Instability of the system 1500 compromises the disk drive's tracking ability and precludes writing either data (e.g., if not self-servo writing, but simply using the spiral patterns as the final servo patterns) or final servo pattern information (i.e., while self-servo writing) at intended locations.

The kernel used in the integrating spiral position correction system 1500 is based upon measurements and simulations of the tracking servo system's error transfer function. Every frequency, except DC, represented by an N-point Discrete Fourier Transform (DFT) (where N is the number of spiral samples about one revolution of the disk) of the tracking servo system's error transfer function, is represented in the kernel. This provides for some degree of repeatable runout correction at every frequency observable to the integrating spiral position correction system.

However, using the above method to determine the kernel implicitly assumes that the track servo system's error transfer function does not undergo significant changes over time (e.g., during the self-servo write process or while seeking slowly across the disk surface). Specifically, the above method requires that the kernel and the actual error transfer function agree to within +/−90 degrees of phase at all times. Failure to meet this requirement will result in instabilities. For example, because the kernel is used to calculate position correction values, when using a kernel that does not correspond with the actual error transfer function of the disk drive, application of position correction values will result in instabilities due to the position error values being integrated.

The inventors have observed phase differences between the kernel and the actual error transfer function which exceed +/−90 degrees during conditions similar to the self-servo write process (e.g., while slowly seeking across the disk surface). The inventors have also observed the associated instabilities in the integrating spiral position correction system.

In view of the above, it would be desirable to develop a technique for reducing or eliminating instabilities in the integrating spiral position correction system due to the kernel not corresponding with the actual error transfer function during self-servo write operations or similar situations. In addition, it would be desirable to account for integrated errors in position correction values due to differences between the kernel and actual error transfer function during the self-servo write process or similar situations.

SUMMARY OF THE INVENTION

The present invention is designed to meet some or all of the aforementioned, and other, needs.

The present invention is directed to a method and apparatus for improving spiral-based position correction system stability via kernel frequency component modification.

In one embodiment, a disk drive includes a disk surface with servo information written thereon. The servo information includes repeatable runout. Position correction values, which are provided for compensating for the repeatable runout, are continuously modified, via integration, while tracking on the servo information. The position correction values, however, include unintended frequency content, which is removed either periodically or continuously.

In one embodiment, the unintended frequency content is removed by periodically resetting the position correction values to zero. In another embodiment, the unintended frequency content is removed by periodically reducing the position correction values. In yet another embodiment, the unintended frequency content is removed by continuously reducing the position correction values.

In one embodiment, the disk drive includes a servo system having an error transfer function. Frequencies are determined where the error transfer function may experience phase changes. Position correction values are calculated using a kernel. Frequency components in the kernel, which correspond to frequencies where the error transfer function may experience phase changes, are removed.

Techniques are known for generating position correction values to compensate for repetitive runout using kernels with reduced or absent frequencies. However, such techniques do not incorporate a feature to periodically or continuously remove unintended frequency components in position correction values.

In another embodiment, a disk drive includes a disk surface with servo information written thereon. The servo information includes repeatable runout. The disk drive includes a servo system having an error transfer function. Frequencies, where the error transfer function may experience phase changes, are determined and the direction of such phase changes are also determined. A kernel, which is used to calculate position correction values to compensate for repeatable runout, is provided. Phases of frequency components in the kernel, which correspond to the frequencies where the error transfer function may experience phase changes, are rotated.

In one embodiment, the phases of the frequency components in the kernel are rotated in a direction corresponding to the phase change directions in the error transfer function. In one embodiment, the phases of the frequency components in the kernel are rotated by at least 45 degrees. In one embodiment, not all of the phases of the frequency components in the kernel are rotated by an equal amount.

Other embodiments, objects, features and advantages of the invention will be apparent from the following specification taken in conjunction with the following drawings.

DETAILED DESCRIPTION OF THE PREFERRED EMBODIMENT

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

Figure 16:
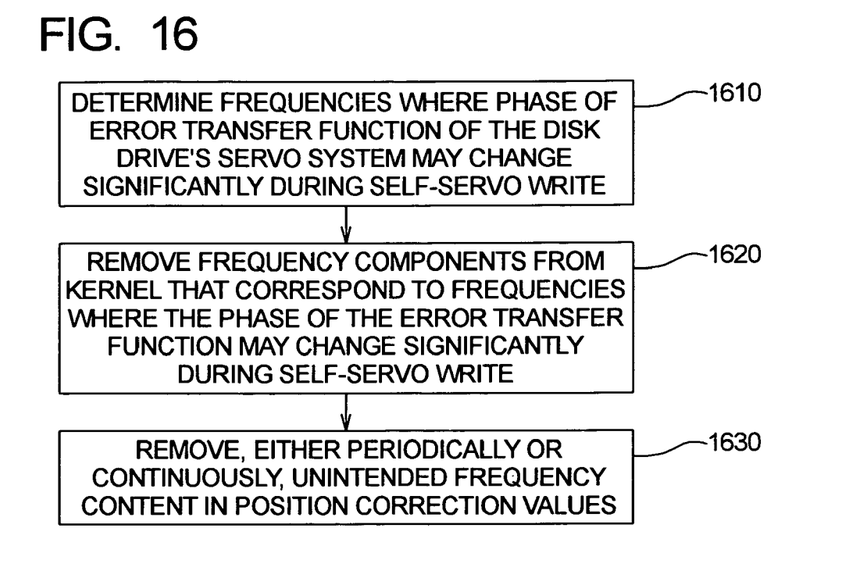
FIG. 16 is a flowchart illustrating an embodiment of the present invention; and, FIG. 17 is a flowchart illustrating another embodiment of the present invention.

A flowchart of one embodiment of the present invention is presented in FIG. 16. First, a determination is made of the frequencies where the phase of the error transfer function of the disk drive's servo system may change significantly during a self-servo write process or while seeking slowly across the disk surface (step 1610). These frequencies are determined, for example, by observing a plurality of drives in a product line over time. For example, the frequencies can be determined by observing drives that have failed the self-servo write process due to a kernel instability problem.

Next, modifications are made to the kernel that is used to approximate the inverse of the error transfer function of the disk drive's servo system. Specifically, frequency components of the kernel that correspond to the frequencies determined in step 1610 are removed (step 1620).

One process for removing specific frequency components from the kernel is to perform a discrete Fourier transform operation upon the kernel, so that the kernel (which is normally represented in the time domain) is represented in the frequency domain. Component pairs of the frequency domain representation of the kernel, which correspond to the frequency components to be removed, are set to zero. Then, the frequency domain representation of the modified kernel is converted back to the time domain.

Next, unintended frequency content that may appear in the position correction values is removed either periodically or continuously (step 1630). The unintended frequency content (or leakage) in the position correction values may be due to non-ideal mathematical representations during the creation of the kernel and/or the computation of the position correction values.

The inventors have developed three techniques for removing the unintended frequency content in the position correction values. It should be understood that, where appropriate, the techniques may be combined with one another.

In a first technique for removing the unintended frequency content, all of the position correction values are periodically reset to zero. The integrating spiral position correction system will rebuild the position correction values. By periodically resetting the position correction values to zero, both useful repetitive runout correction information and the unintended frequency content will be removed. Generally, it will not take long for the integrating spiral position correction system to rebuild position correction values that include useful repetitive runout correction information. However, because the unintended frequency content is small, it will take a relatively longer period of time to accumulate the unintended frequency content in the position correction values.

In a second technique for removing the unintended frequency content, all of the position correction values periodically undergo decay for a limited amount of time, while the integrating spiral position correction system simultaneously rebuilds the values. For example, each value would be reduced by 5% per revolution of the disk for a dozen revolutions. This would reduce the unintended frequency content to $0.95^{12}=54\%$ of prevailing levels every time the decay is applied.

In a third technique for removing the unintended frequency content, all of the position correction values continuously undergo a minute decay, while the integrating spiral position correction system simultaneous rebuilds the values. In this case, the decay rate must be greater than the rate at which the unintended frequency content is accumulated (leakage rate). It should be noted that the resultant position correction values are slightly undersized.

Figure 17:
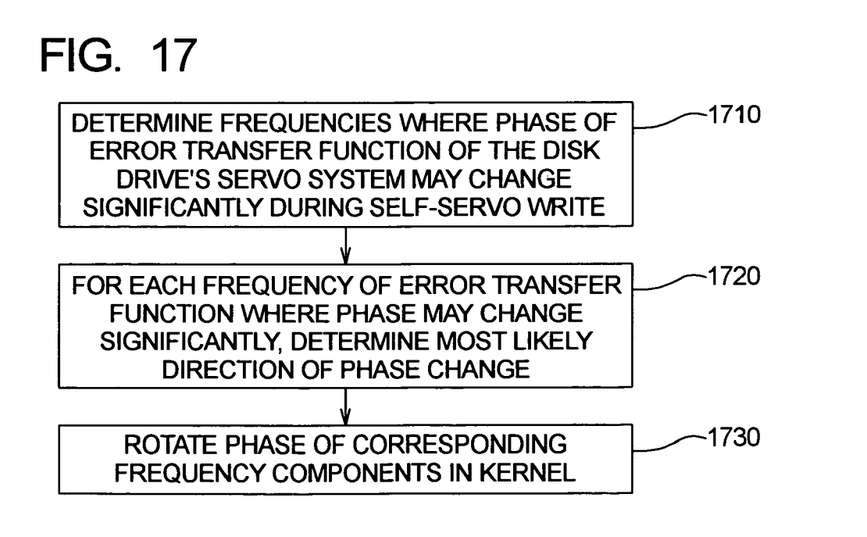

A flowchart of another embodiment of the present invention is presented in FIG. 17. First, a determination is made of the frequencies where the phase of the error transfer function of the disk drive's servo system may change significantly during a self-servo write process or while seeking slowly across the disk surface (step 1710).

Next, for each frequency of the error transfer function where the phase is likely to significantly change during self-servo writing or during slow seeks across the disk surface, a determination is made of the direction in which the phase is most likely to change (step 1720). The direction of the phase change may be determined by, for example, examining a nominal error function and understanding plant changes (e.g., pivot bearing changes) at low-frequency.

Next, based upon the determination made in step 1720, the phase of corresponding frequency components in the kernel are rotated (step 1730). By rotating the phase of the corresponding frequency components in the kernel, more stability margin is provided in the event of the expected change in the error transfer function. However, less stability margin is provided at the normal operating point.

In one embodiment, kernel gain may be reduced at the rotated frequencies to compensate for less phase stability in the integrating spiral position correction system.

In one embodiment, the phases of certain frequency components in the kernel are rotated by at least 45 degrees. In another embodiment, the phases of certain frequency components in the kernel are rotated by at least 60 degrees.

It should be noted that not all of the phases of the frequency components in the kernel need to be rotated by the same amount. In fact, it is expected that the phase rotation will be different for different frequency components in the kernel.

Changes in the error transfer function of the disk drive's servo system may be due to a number of factors. The present invention is not intended to be limited to any one of these factors.

It should be noted, however, that changes at certain frequencies in the error transfer function may be due to in-situ changes in the voice coil motor or the bearing associated therewith. However, the present invention may be used when there are changes at certain frequencies in the error transfer function due to any changes to the disk drive's plant.

Embodiments of the present invention take advantage of the fact that position correction values are continuously integrated. It should be understood that the concepts of the present can be extended to any disk drive servo system in which position correction values are continuously integrated. Consequently, the concepts of the present invention are not limited to the integrating position correction system described herein.

It should be understood that the present invention is not limited to being used in self-servo writing operations. For example, the present invention may be used when the spiral servo patterns comprise the final servo patterns on the disk surface.

Furthermore, if the present invention is used in self-servo writing operations, it should be understood that the present invention is not limited to self-servo writing operations that include spiral servo information. For example, the present invention may be used in self-servo writing operations that use servo information in other patterns or generated using other techniques (e.g., servo patterns on printed media).

By using the present invention in connection with self-servo writing, yields in the self-servo write process have been improved. Specifically, the occurrence of instabilities in the integrating spiral position correction system have been reduced, where such instabilities previously caused the self-servo write process to fail in some drives.

It should be understood that, among other things, a kernel can be associated with a single drive or with a product line of drives.

It should also be understood that the present invention is preferably based in firmware and/or software, although it may also be based in hardware.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A method comprising the steps of:
   providing a disk drive having a disk surface with servo information written thereon, said servo information including repeatable runout;
   providing position correction values to compensate for said repeatable runout, the position correction values including unintended frequency content, wherein the position correction values are calculated using a kernel and wherein the unintended frequency content in the position correction values is due to non-ideal representations of the kernel;
   removing, either periodically or continuously, the unintended frequency content in the position correction values.

2. The method of claim 1 wherein the unintended frequency content is removed by periodically resetting the position correction values to zero.

3. The method of claim 2 wherein the position correction values are continuously modified, via integration, while tracking on the servo information.

4. The method of claim 1 wherein the unintended frequency content is removed by periodically reducing the position correction values.

5. The method of claim 4 wherein the position correction values are continuously modified, via integration, while tracking on the servo information.

6. The method of claim 1 wherein the unintended frequency content is removed by continuously reducing the position correction values.

7. The method of claim 6 wherein the position correction values are continuously modified, via integration, while tracking on the servo information.

8. The method of claim 1 wherein the disk drive includes a servo system and wherein the servo system has an error transfer function, the method further including the step of:
   determining frequencies where the error transfer function may experience phase changes.

9. The method of claim 8 wherein the phase changes occur during a self-servo write process.

10. The method of claim 8 further including the steps of:
    calculating the position correction values using a kernel;
    removing frequency components from the kernel that correspond to frequencies where the error transfer function may experience phase changes.

11. A method comprising the steps of:
    providing a disk drive having a disk surface with servo information written thereon, said servo information including repeatable runout, said disk drive including a servo system having an error transfer function;
    determining frequencies where the error transfer function may experience phase changes and determining the direction of the phase changes;
    providing a kernel, which is used to calculate position correction values to compensate for said repeatable runout;
    rotating phases of frequency components in the kernel that correspond to the frequencies where the error transfer function may experience phase changes.

12. The method of claim 11, wherein the phases of the frequency components in the kernel are rotated in a direction corresponding to the phase change directions in the error transfer function.

13. The method of claim 11 wherein the phase changes in the error transfer function occur during a self-servo write process.

14. The method of claim 11 wherein kernel gain is reduced at frequency components corresponding with the rotated phases.

15. The method of claim 11 wherein the phases of the frequency components in the kernel are rotated by at least 45 degrees.

16. The method of claim 11 wherein the phases of the frequency components in the kernel are rotated by at least 60 degrees.

17. The method of claim 15 wherein not all of the phases of the frequency components in the kernel are rotated by an equal amount.

18. An apparatus comprising:
    a disk drive having a disk surface with servo information written thereon, said servo information including repeatable runout;
    circuitry for providing position correction values for compensating for said repeatable runout, the position correction values including unintended frequency content, wherein the position correction values are calculated using a kernel and wherein the unintended frequency content in the position correction values is due to non-ideal representations of the kernel;
    circuitry for removing, either periodically or continuously, the unintended frequency content in the position correction values.

19. A disk drive comprising:
a disk surface with servo information written thereon, said servo information including repeatable runout, said disk drive including a servo system having an error transfer function;
circuitry for determining frequencies where the error transfer function may experience phase changes and determining the direction of the phase changes;
circuitry for providing a kernel, which is used to calculate position correction values to compensate for said repeatable runout;
circuitry for rotating phases of frequency components in the kernel that correspond to the frequencies where the error transfer function may experience phase changes.

20. A method comprising the steps of:
providing a disk drive having a disk surface with servo information written thereon, wherein said servo information includes repeatable runout, wherein the disk drive includes a servo system and wherein the servo system has an error transfer function;
determining frequencies where the error transfer function may experience phase changes;
providing position correction values to compensate for said repeatable runout, the position correction values including unintended frequency content;
removing, either periodically or continuously, the unintended frequency content in the position correction values.

21. The method of claim 20 wherein the unintended frequency content is removed by periodically resetting the position correction values to zero.

22. The method of claim 20 wherein the position correction values are continuously modified, via integration, while tracking on the servo information.

23. The method of claim 20 wherein the unintended frequency content is removed by periodically reducing the position correction values.

24. The method of claim 23 wherein the position correction values are continuously modified, via integration, while tracking on the servo information.

25. The method of claim 20 wherein the unintended frequency content is removed by continuously reducing the position correction values.

26. The method of claim 25 wherein the position correction values are continuously modified, via integration, while tracking on the servo information.

27. The method of claim 20 wherein the phase changes occur during a self-servo write process.

28. The method of claim 27 wherein the unintended frequency content is removed by periodically resetting the position correction values to zero.

29. The method of claim 27 wherein the position correction values are continuously modified, via integration, while tracking on the servo information.

30. The method of claim 27 wherein the unintended frequency content is removed by periodically reducing the position correction values.

31. The method of claim 29 wherein the position correction values are continuously modified, via integration, while tracking on the servo information.

32. The method of claim 27 wherein the unintended frequency content is removed by continuously reducing the position correction values.

33. The method of claim 32 wherein the position correction values are continuously modified, via integration, while tracking on the servo information.

34. The method of claim 20 further including the steps of:
calculating the position correction values using a kernel;
removing frequency components from the kernel that correspond to frequencies where the error transfer function may experience phase changes.

35. The method of claim 34 wherein the unintended frequency content is removed by periodically resetting the position correction values to zero.

36. The method of claim 34 wherein the position correction values are continuously modified, via integration, while tracking on the servo information.

37. The method of claim 34 wherein the unintended frequency content is removed by periodically reducing the position correction values.

38. The method of claim 37 wherein the position correction values are continuously modified, via integration, while tracking on the servo information.

39. The method of claim 34 wherein the unintended frequency content is removed by continuously reducing the position correction values.

40. The method of claim 39 wherein the position correction values are continuously modified, via integration, while tracking on the servo information.

41. The apparatus of claim 18 wherein the disk drive includes a servo system and wherein the servo system has an error transfer function, further including:
circuitry for determining frequencies where the error transfer function may experience phase changes.

42. The apparatus of claim 41 wherein the phase changes occur during a self-servo write process.

43. The apparatus of claim 41 further including:
circuitry for calculating the position correction values using a kernel;
circuitry for removing frequency components from the kernel that correspond to frequencies where the error transfer function may experience phase changes.

44. An apparatus comprising:
a disk drive having a disk surface with servo information written thereon, wherein said servo information includes repeatable runout, wherein the disk drive includes a servo system and wherein the servo system has an error transfer function;
circuitry for determining frequencies where the error transfer function may experience phase changes;
circuitry for providing position correction values for compensating for said repeatable runout, the position correction values including unintended frequency content;
circuitry for removing, either periodically or continuously, the unintended frequency content in the position correction values.

45. The apparatus of claim 44 wherein the phase changes occur during a self-servo write process.

46. The apparatus of claim 44 further including:
circuitry for calculating the position correction values using a kernel;
circuitry for removing frequency components from the kernel that correspond to frequencies where the error transfer function may experience phase changes.

47. The disk drive of claim 19 wherein the phases of the frequency components in the kernel are rotated in a direction corresponding to the phase change directions in the error transfer function.

48. The desk drive of claim 19 wherein the phase changes in the error transfer function occur during a self-servo write process.

49. The disk drive of claim 19 wherein kernel gain is reduced at frequency components corresponding with the rotated phases.

50. The disk drive of claim 19 wherein the phases of the frequency components in the kernel are rotated by at least 45 degrees.

51. The disk drive of claim 19 wherein the phases of the frequency components in the kernel are rotated by at least 60 degrees.

52. The disk drive of claim 50 wherein not all of the phases of the frequency components in the kernel are rotated by an equal amount.

* * * * *